United States Patent [19]

Foley

[11] 3,792,544

[45] Feb. 19, 1974

[54] TELEPHONE INDEX DEVICES

[76] Inventor: James P. Foley, Crest Rd., Katonah, N.Y. 10536

[22] Filed: Feb. 18, 1971

[21] Appl. No.: 116,384

Related U.S. Application Data

[63] Continuation-in-part of Ser. No. 8,660, Feb. 4, 1970, abandoned, which is a continuation-in-part of Ser. No. 837,405, June 30, 1969, Pat. No. 3,706,503.

[52] U.S. Cl. .......................... 40/336, 40/102, 402/4, 402/69

[51] Int. Cl. .......................... G09f 3/00

[58] Field of Search .......................... 40/336–339; 402/4, 402/8, 19, 21–22, 57, 59, 68, 70–71, 80; 281/42, 45

[56] References Cited

UNITED STATES PATENTS

| | | | |
|---|---|---|---|
| 2,915,841 | 12/1959 | Van Dyke | 40/336 |
| 1,390,199 | 9/1921 | Gale | 40/360 |
| 2,990,639 | 7/1961 | Van Gieson | 40/336 |
| 3,052,056 | 9/1962 | Eisenstein | 40/336 |
| 934,888 | 9/1909 | Dahlberg | 402/69 |
| 1,150,716 | 8/1915 | Stember | 402/75 |
| 2,031,373 | 2/1936 | Lexow | 402/69 |
| 2,760,490 | 8/1956 | Schade | 402/77 |
| 3,111,949 | 11/1963 | Duncan et al. | 402/76 |
| 3,436,855 | 4/1969 | Foley | 40/336 |
| 2,460,718 | 2/1949 | Stevens | 402/26 |
| 3,706,503 | 12/1972 | Foley | 402/69 |

*Primary Examiner*—Robert W. Michell
*Assistant Examiner*—A. J. Heinz

[57] ABSTRACT

Telephone index devices including a flat base member which may be secured to a telephone and having binding loops which may be closed and opened for replacement of index sheets. Bracket and frame devices for securing the base member in place are also described.

8 Claims, 21 Drawing Figures

INVENTOR.
JAMES P. FOLEY
BY
Ward McElhannon Brooks & Fitzpatrick
ATTORNEYS

INVENTOR.
JAMES P. FOLEY
BY
Ward McElhannon Brooks & Fitzpatrick
ATTORNEYS

INVENTOR.
JAMES P. FOLEY
BY
Ward McElhannon Brooks & Fitzpatrick
ATTORNEYS

PATENTED FEB 19 1974

3,792,544

SHEET 4 OF 4

INVENTOR.
JAMES P. FOLEY
BY
Ward McElhannon Brooks & Fitzpatrick
ATTORNEYS

TELEPHONE INDEX DEVICES

This is a continuation-in-part of a copending application Ser. No. 8,660, filed Feb. 4, 1970, and now abandoned which in turn is a continuation-in-part of a copending application Ser. No. 837,405, filed June 30, 1969, now U.S. Pat. No. 3,706,503.

This invention relates to index devices, and more particularly, it concerns novel arrangements for holding index leaves in place for convenient accessability and use.

The invention has particular application to telephone index devices of the type shown and described in U. S. Pat. application Ser. No. 837,405, filed June 30, 1969 in the name of the present applicant. The telephone index devices of that application comprise a frame member which is secured to the underside of a telephone, and a slide member which is mounted by the frame member to slide in and out under the telephone. The slide member also serves as an index sheet holder and binds together several index sheets along one edge so that they can be turned, in book-like fashion, when the slide member is pulled out from under the telephone. The leaves are held to the slide member by means of aligned binding loops which are struck from the slide member as prongs along near one edge of the slide member and which bend over and back down to the surface of the slide member. The binding loops pass through corresponding openings near one edge of the leaves and serve to hold the leaves to the slide member while permitting them to be turned easily in book-like fashion and to allow them to lie flat when opened to any leaf.

Various provisions are made in the arrangements of the previously filed application for inserting leaves into the loops. In one case, the leaves are inserted during manufacture while the loops are opened, and the loops are then subjected to machine action which closes them and secures them permanently. In another case, the base member on which the loops are mounted, is made up of two flat portions which are resiliently hinged together along a line passing between the legs of each loop. One leg of each loop is permanently secured along one of the base member portions while the other leg extends down to the other base member portion without, however, being secured to it. Sheets or leaves are inserted by first bending down one of the base member portions along the hinge to expose the free ends of the loops. The sheets are passed onto the loops and the base member portions are returned to coplanar condition to close the free ends of the loops.

The present invention provides improvements to the above-described loop opening and closing arrangement. According to one aspect of the present invention, the hinge is eliminated and the two base member portions are provided with mutually engageable recesses and projections which prevent relative movement in their common plane. Means are further provided to prevent relative movement out of their plane. The further means may simply comprise a strip of tape along one or both sides of the two base member portions where their projections and recesses engage. Other means such as an adhesive or even a weld may also be provided.

The projections may be configured with ears or lateral extensions to provide complete lateral interlock in the manner of a jigsaw puzzle.

The use of projections and recesses permits a very sturdy construction since torque or bending forces between the two base member portions cannot pass along any single line of contact. Instead, any such bending forces must pass through one or more of the extensions and/or regions adjacent the recesses.

According to another aspect of the present invention there are provided loop opening and closing arrangements which may be easily operated and which are positive in their manner of holding the binding loops closed. These loop opening and closing arrangements comprise a closure strip which extends along a side of the base or support member on which the sheets are supported. The binding loops, which are struck from or are molded with the base member, have one leg attached to the edge of the base or support member while the other leg extends out from the base member. The loop closure strip and the base member are provided with holding formations such as tongues and sockets which permit the closure strip to be moved in coplanar relationship with the base member and held against its edge to close the outer ends of the binding loops. The holding formations, in one form of the invention, include a pivot coupling between the base member and one end of the locking strip which enables the locking strip to swing in the plane of the base member against and out away from its edge.

The present invention also involves, in one aspect, the provision of novel index assembly holding means. This novel means, which may be used to secure a spirally bound index sheet booklet in a secure yet releasable manner to a base member, involves the provision of an elongated sheet as the last sheet of the booklet, and a pair of strips which overlay the elongated regions of the last sheet. The strips have depending lugs which pass through corresponding holes in the last sheet and into openings in the base member. The base member openings frictionally hold the lugs and the strips in place and thereby secure the book assembly to the base member.

According to a still further aspect of the invention provision is made for mounting a telephone index assembly on the side of a telephone in a way permitting it to be positionally adjusted or even removed for replacement or remote reference. This provision includes a bracket member which may be affixed to a telephone, and having a socket, and a flat base member for supporting telephone index sheets and having a socket engaging plug secured to the underside thereof. The plug fits frictionally into the socket and allows the base member to be pivoted or removed.

According to still another aspect of the invention, a more versatile telephone index arrangement is obtained which permits a single construction to be accommodated to different kinds of cradle or desk-type telephones. In applicant's aforementioned previously filed application, telephone index devices were described which included a generally flat frame member secured to the underside of a telephone, and an index sheet carrier held by the frame member in a manner permitting the carrier to slide under and out from the telephone. The frame member had cutout regions at each of its two forwardmost corners and these cutout regions were of a size and configuration to fit closely around the front two legs of the telephone. This provided stability against movement in the plane of the frame member, and in this manner assisted in the attachment of the frame member to the underside of the telephone. In order to achieve optimum stability with certain holding arrangements, it is necessary that the corner cutouts of the frame member be of a size and configuration which will closely accommodate the telephone legs. A problem has arisen, however, in that telephones having different leg sizes and shapes are now in use and a different frame corner cutout configuration is required for each different shape. Previously, it was necessary to provide different frame members manufactured on separate molding dies and to specify the frame member according to the type of telephone with which it was to be used.

The present invention overcomes the problem discussed above and makes possible the use of a single basic frame configuration which easily accommodates telephones of one or another leg configuration. This is achieved according to the present invention by forming the frame member with snap out elements in the corner regions. The snap out elements are integrally molded with the frame member, but are separable therefrom along well defined score lines. The score lines are shaped to conform to the shape of the larger telephone leg size which the device may have to accommodate. The score lines may be perforated or they may be indented in order to facilitate removal of the snap out elements. On the other hand, thicker regions are strategically located to maintain strength in normal usage when the snap out elements are left in place. The snap out elements themselves are cut out according to a configuration to accommodate the smaller telephone leg size; and in the event the index device is to be used with telephones of this type, the snap out elements may be left in place.

Various further and more specific objects, features and advantages of the invention will appear from the description given below, taken in connection with the accompanying drawings, illustrating by way of example preferred forms of the invention.

Figures 1, 2, 3, 4, 5, 6:
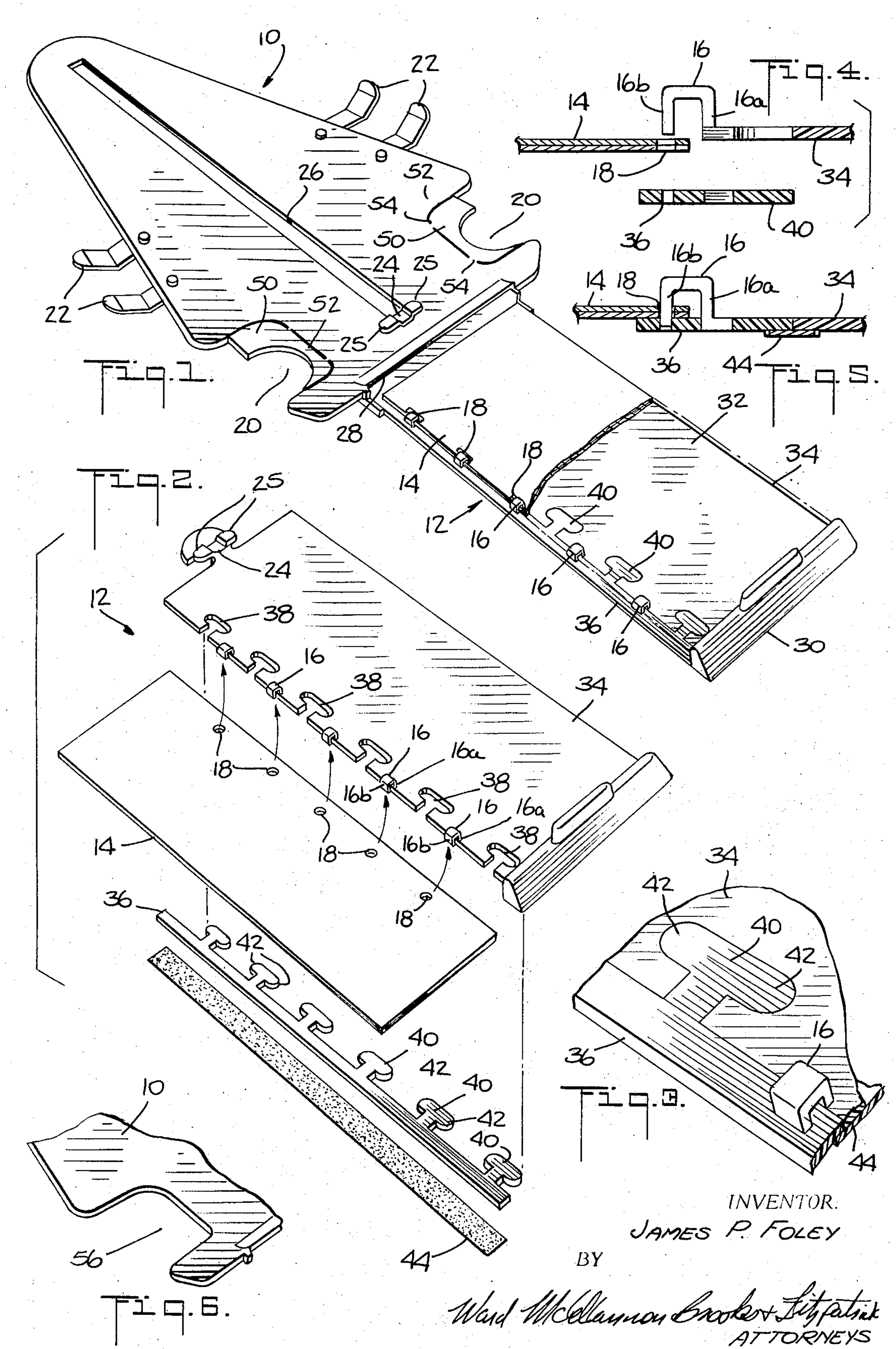
FIG. 1 is a perspective view, partially cut away, of a telephone index device in which the principles of the present invention are embodied.
FIG. 2 is an exploded perspective view of a carrier assembly used in the telephone index device of FIG. 1.
FIG. 3 is an enlarged fragmentary view of a selected region of the carrier assembly of FIG. 2.
FIG. 4 is an enlarged section view of the carrier assembly portion of the telephone index device of FIG. 1, and showing the carrier assembly in preassembled condition.
FIG. 5 is a view similar to FIG. 4, but showing the carrier assembly in assembled condition.
FIG. 6 is a fragmentary perspective view of a front corner portion of the telephone index device of FIG. 1, modified according to the present invention to accommodate a larger leg size telephone.

The telephone index device of FIG. 1 includes a generally flat frame member 10 of generally triangular shape and a size which will fit comfortably under and between the legs of cradle or desk-type telephones (not show). A carrier assembly 12 is arranged to be slid in and out under the frame member in drawer-like fashion to be concealed under the telephone or to be fully opened to expose a plurality of index sheets or leaves 14 on which telephone number information is written. The index sheets 14 are bound in book-like fashion along one edge by means of binding loops 16 which pass through openings 18 in the sheets.

The frame member 10 may be molded of plastic material such as polyethylene or polypropylene. Conventional injection molding processes may be employed. As can be seen in the drawing, the frame member 10 is formed with two front corner cutouts 20. These are shaped and proportioned to fit closely with the front legs of a telephone. A plurality of locking tabs 22 extend from the sides of the frame member. The tips of these tabs may be wedged up between the cover and the base of the telephone to lock the frame member in place. Other securing means may be provided, however.

The carrier assembly 12, as shown in FIG. 2, is also of generally flat configuration, and like the frame member 10, it may also be formed of similar plastic material injection molded according to known techniques. The rear of the carrier assembly is formed with an upstanding lug 24 having laterally extending ears 25. The ears extend up and over the edges of a central longitudinal slot 26 in the frame member 10 (FIG. 1) to permit the carrier assembly to slide in and out while being securely held by the frame member. The carrier assembly passes through a transverse slot 28 formed in the front of the frame member, and this helps to guide the carrier assembly during its movement. A handle 30 is integrally molded on the front of the carrier assembly.

The carrier assembly 12 includes a flat base region 32 extending between the lug 24 and the handle 30; and the index sheets 14 rest on this base region. The base region includes a main portion 34 and a separate edge portion 36. The edge portion 36 is narrower than the main portion 34 and it extends along one edge of the main portion. As can be seen in FIG. 2, the main portion 34 is provided with a series of recesses 38, while the edge portion 36 is formed with a plurality of projections 40 which fit closely into the recesses 38. The projections 40 preferably are shaped to interlock in jigsaw puzzle fashion with the recesses 38 to provide locking against relative movement in any direction in the plane of the base region. As shown in FIG. 3, this interlocking can be achieved by means of lateral extensions or ears 42 on the projections 40.

As shown in FIG. 2, one leg **16*a* of each of the binding loops 16 is permanently secured to and may even be molded integrally with the main portion 34. The loops extend up and over so that a free leg 16*b* of each loop is located out beyond the edge of the main portion 34 to contact the surface of the edge portion 36 when it is positioned in assembly with the main portion, as illustrated in FIG. 1**.

The index sheets 14 are fitted onto the exposed free ends of the binding loops 16 before the edge portion 36 is assembled with the main portion 34. This is illustrated in FIGS. 2 and 4. Thereafter, the edge portion 36 is fitted to the main portion, as shown in FIG. 5, so that it lies against the main portion in coplanar relationship therewith and so that the free ends of the binding loops become closed by the surface of the edge portion.

The projections 40 of the edge portion 36 are, of course, interlocked with the recesses 38 of the main portion 34 in this assembly, as shown in FIG. 3, so that the portions cannot become disassembled by lateral movement. Means are provided to secure the assembled portions against relative movement out of their common plane. Such means may, for example, include a strip of tape 44 (FIGS. 2 and 5) which extends along the mutually adjacent edges of the main and edge portions 34 and 36. The tape 44 should also pass across and intercept each of the projections 40 and recesses 38. Increased strength can be obtained by use of tape strips on both the upper and lower surfaces of the main and edge portions. Also, other securing means can be added or substituted. Such other securing means may include adhesives which bind the portions together along their line of contact, or it may include actual welding which may be provided by application of heat or ultrasonic vibrations.

The projections 40 and recesses 38 may be interposed; that is, the projections may be provided on the main portion 34 while the recesses are provided on the edge portion 36.

It will be appreciated that the projections 40, in addition to providing solid interlock against lateral relative movement between the main and edge portions of the carrier assembly base region, also cooperate to reduce stresses on any means which are used to prevent relative movement out of their common plane. One reason for this is that the projections and recesses extend the line of contact between the two portions. In addition, the inherent strength of the portions themselves is used to bridge the binding loop region so that there is no elongated line of joinder about which bending or twisting forces may be exerted.

It will also be seen in FIG. 4 that the free leg **16*b* of each of the loops extends down below the upper surface of the main portion 34. There is also provided a corresponding hole in the edge portion 36 which receives the free leg of the binding loop when the two portions 34 and 36 are assembled. The hole is dimensioned to produce a press fit with the binding loop; and this in turn greatly augments the basic rigidity of the assembled structure. By way of example, the carrier portions 34 and 36 may each have a thickness of 0.038 inches while the free leg 16*a* of the binding loops may extend down below the upper surface of the main portion by 0.030 inches, thereby leaving a clearance of 0.008 inches between the end of the binding loop leg and the bottom surface of the edge portion 36. The tight fit between the end of each binding loop free leg 16*b* and the corresponding hole 46 of the edge portion 36 helps to prevent any bending or turning of the edge portions relative to the main portion 34. In order even further to promote rigidity in assembly, the projections 40 and the corresponding recesses 38 may be dimensioned to provide a press fit, thereby taking advantage of the partial elasticity of the plastic materials of which the main and edge portions 34 and 36** of the carrier assembly are formed.

Reverting now to FIG. 1, it will be seen that at the front corners of the frame member 10 in the regions surrounding the front corner cutouts 20, there are provided snap out elements 50. These snap out elements are integrally molded with the frame member 10, but are defined with respect threto by means of score lines 52 which are seen as indentations in the surface of the frame member. Along the score lines 52, there are provided perforations. The score lines have thickened regions 54 at selected strategic locations to provide strength for the snap out element when it is being used. Application of bending forces will, however, readily fracture the thickened regions 54 so as to allow the snap out regions to be removed along the score lines 50.

As can be seen in FIG. 6, the score lines 50 are shaped to define cutout corner regions 56 which will closely accommodate the legs of a larger leg telephone when the snap out regions are removed. Thus, it will be seen that a single frame member can be readily adapted for use with telephones of different leg size; and such frame member will perform effectively for the particular size to which it is adapted.

Figures 7, 8, 9, 10, 11, 12:
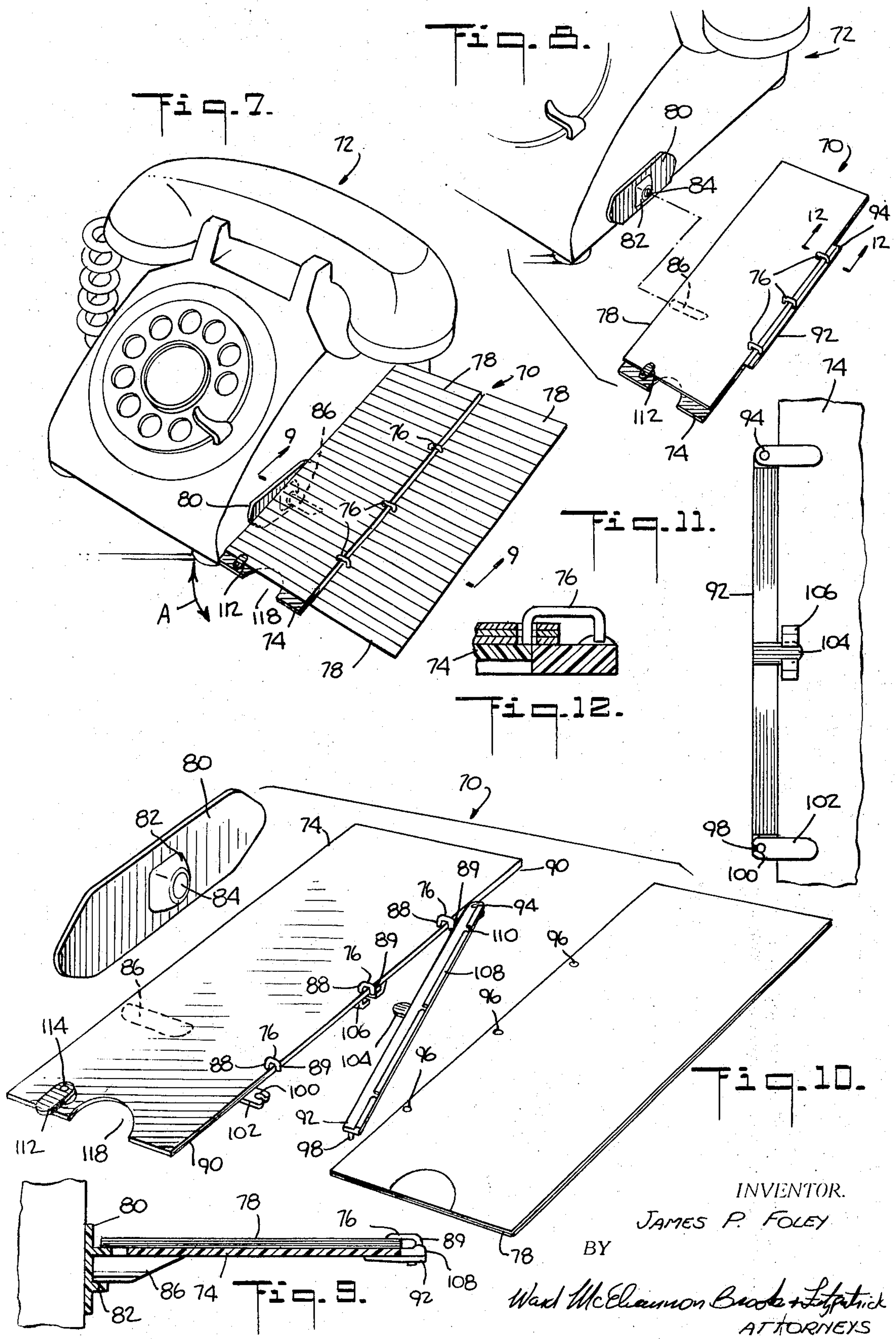
FIG. 7 is a perspective view of a telephone index device, constituting a further embodiment of the invention, attached to the side of a telephone.
FIG. 8 is a view similar to FIG. 7 but illustrating the index device as removed from the telephone.
FIG. 9 is an enlarged section view taken along line 9—9 of FIG. 7.
FIG. 10 is an enlarged exploded perspective view of the telephone index device of FIG. 7.
FIG. 11 is a fragmentary bottom view of the index device of FIG. 7.
FIG. 12 is an enlarged section view taken along line 12—12 of FIG. 8.

The telephone index devices shown in FIGS. 7–21 are not mounted underneath the telephones with which they are used; but instead they are attached to the side of the telephone. As shown in FIG. 7, a telephone index device 70 is attached as by means of glue or double backed pressure adhesive tape to one side of the outer cover of a cradle type telephone 72. The telephone index device 70 includes a flat, rectangularly shaped base member 74 having a plurality of binding loops 76 thereon which hold a stack of index sheets 78 in ring binder fashion. The base member 74 is attached to a mounting plate 80 which, in turn, is secured to the telephone 72 by means of an adhesive substance.

The manner in which the base member 74 is held by the mounting plate 80 is best shown in FIGS. 8 and 9. As can be seen therein, the mounting plate 80 is provided with a boss 82 extending a short distance out from the central portion thereof. The boss 82 has an opening 84 therein which accommodates a cylindrical mounting plug 86. The mounting plug 86, which is attached to the underside of the base member 74, is held snugly in the opening 84. It can, however, pivot within the opening 84 to adjust the position of the index device as indicated by the arrow A in FIG. 7. If desired the mounting plug 86 may be withdrawn from the mounting plate 80 as illustrated in FIG. 8. This allows removal of the entire telephone index assembly from the telephone for any desired purpose, e.g., to add or remove index sheets, to refer to the information printed on the sheet at a different location or to add new information to the sheets.

The construction of the base member 74 is best shown in the exploded view of FIG. 10. As can be seen the base member 74, which is preferably made of a plastic substance, such as polystyrene or polypropylene, is of rectangular slab-like configuration. The binding loops 76 are of inverted U-shaped configuration and are positioned so that one leg 88 of each loop extends up from one edge 90 of the base member. The other leg 89 of each of the U-shaped binding loops 76 extends downwardly out away from the edge 90 of the base member. A loop closure strip 92 is pivotally secured at one end 94 to the edge 90 of the base member 74. The loop closure strip 92 moves pivotally in the plane of the base member 74 from an open position as shown in FIG. 10 to a closed position as shown in FIGS. 11 and 12. In the closed position, the loop closure strip 92 abuts the edge 90 of the base member 74 and effectively closes the bottom of each of the binding loops 76. When the closure strip 92 is pivoted to an open position as shown in FIG. 10, the bottoms of the binding loops 76 are opened to accept the various index sheets 78. As can be seen in FIG. 10 the index sheets 78 are provided with binding loop openings 96 near one edge. To load the index sheets onto the device, the sheets are fitted to the exposed outer legs of the binding loop 76 by passing the legs through the openings 96. Thereafter the binding loops are closed to secure the sheets in place by moving the loop closure strip to its loop closing position against the edge of the base member.

The end of the closure strip 92 opposite the pivot 94 is provided with a downwardly extending locking lug 98 shown in FIGS. 10 and 11. This locking lug fits into a locking lug opening 100 in a locking tab 102 which projects out from under the edge 90 of the base member 74. The opening 100 and the locking lug 98 are dimensioned and configured to provide a snap fit to hold the loop closure strip 92 securely yet releasably in its loop closure position shown in FIGS. 11 and 12.

The loop closure strip 92 is additionally provided with a guide tab or tongue 104 which extends inwardly from its lower surface toward and under the base member 74. The guide tab 104 is accommodated in a guide tab socket 106 formed on the underside of the base member 74. The guide tab 104 and the guide tab socket 106 serve to maintain the loop closure strip 92 firmly in coplanar relationship with the base member 74 when the closure strip is locked in its loop closure position shown in FIGS. 11 and 12.

The loop closure strip 92 is additionally provided with a slightly raised outer edge 108 which is interrupted as shown at 110 in FIG. 10 to accommodate the outer ends of each of the binding loops 76. This configuration, as can be seen in FIG. 12, serves to insure that the binding loops are fully closed by the loop closure strip 92 so that the index sheets 78 cannot be removed when the closure strip is in its closed position.

The base member 74, the binding loops 76 and the loop closure strip 92 may be made of any suitable materials; however, it is presently preferred to make them of molded plastic such as polystyrene or polypropylene. Where polypropylene is used it is possible to manufacture the entire base member 74 including the pivotal connection 94, the binding loops 76 and the loop closure strip 96 in a single molding operation. This, of course, eliminates assembly and fastening procedures and considerably reduces the cost of manufacture of the device. As can be seen in FIGS. 7, 8 and 10, there may be provided a page holding tab 112 along the bottom edge of the base member 74 near the edge opposite the binding loop edge 90. As can be seen in FIG. 7, this page holding tab 112 may be pivoted upwardly to engage the lower edge of the sheets which lie on the base member 74. This protects against any tendency which the sheets may have to curl after extended usage. The tab 112 is mounted on a pivot 114 along with a spacer between the tab and the base member so that the tab pivots in the plane of the base member 74 a short distance above its surface.

The base member is additionally provided with a thumb cutout 118 along its lower edge adjacent the page holding tab 112. This thumb cutout permits insertion of the thumb to engage and turn any or all of the index sheets 78 as may be desired.

Figures 13, 14, 15, 16:
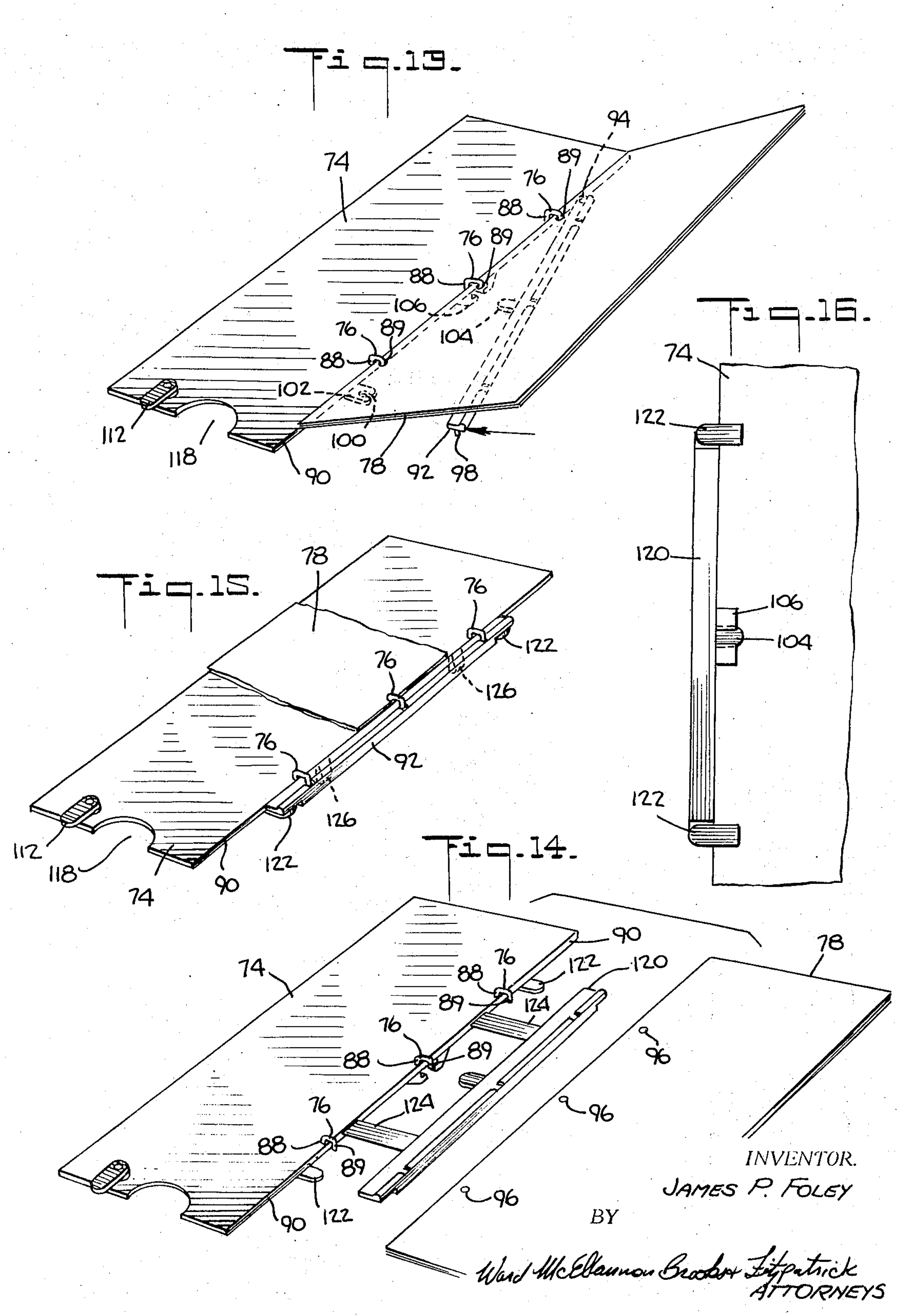
FIG. 13 is a perspective view illustrating the manner of operation of the telephone index device of FIG. 7.
FIG. 14 is a perspective view of a modification to the telephone index device of FIG. 7.
FIG. 15 is a view similar to FIG. 14 but showing the telephone index device in its binding loop closing position.
FIG. 16 is a fragmentary bottom view of the telephone index device shown in FIG. 15.

The embodiment of FIGS. 14–16 differs from that of FIGS. 7–13 in that in place of the pivotally mounted loop closure strip 92 there is provided a laterally removable loop closure strip 120. As can be seen in FIG. 14 a pair of closure strip support tabs or tongues 122 extend outwardly from under the edge 90 of the base member 74 on opposite sides of the guide tab socket 106. The support tongues 122 accommodate the ends of the closure strip 120 and they cooperate with the closure strip, its guide tab 104 and the guide tab socket 106 to hold the closure strip 120 in loop closing position as shown in FIGS. 15 and 16. It will be appreciated that when the loop closure strip is moved out and away from the base member 74 in coplanar relationship therewith the outer ends of the binding loops 76 are completely exposed for accommodation of the binding loop openings 96 in the index sheets 78. Moreover, the closure strip support tongues 122 permit the closure strip 120 to be moved laterally into loop closing position and yet support the closure strip securely in coplanar relationship with the base member to insure that the binding loops remain closed during use of the device and turning of the various index sheets 78.

Where the index device is manufactured of a high strength plastic material such as polypropylene, it is possible to manufacture the closure strip and base member in a single operation as a single unitary structure by providing in the mold arrangements whereby ribbon-like connectors 124 of the polypropylene or similar material extend between the loop closure strip 120 and the base member 74. These ribbon-like connectors may be approximately one-fourth inch wide and about 0.010 thick. This allows the connectors 124 to hold the loop closure strip 120 to the base member 74 as shown in FIG. 14 and at the same time it allows the connectors to assume loop like configurations 126 as shown in FIG. 15 when the loop closure strip 120 is in its loop closing position.

Figures 17, 18, 19, 20, 21:
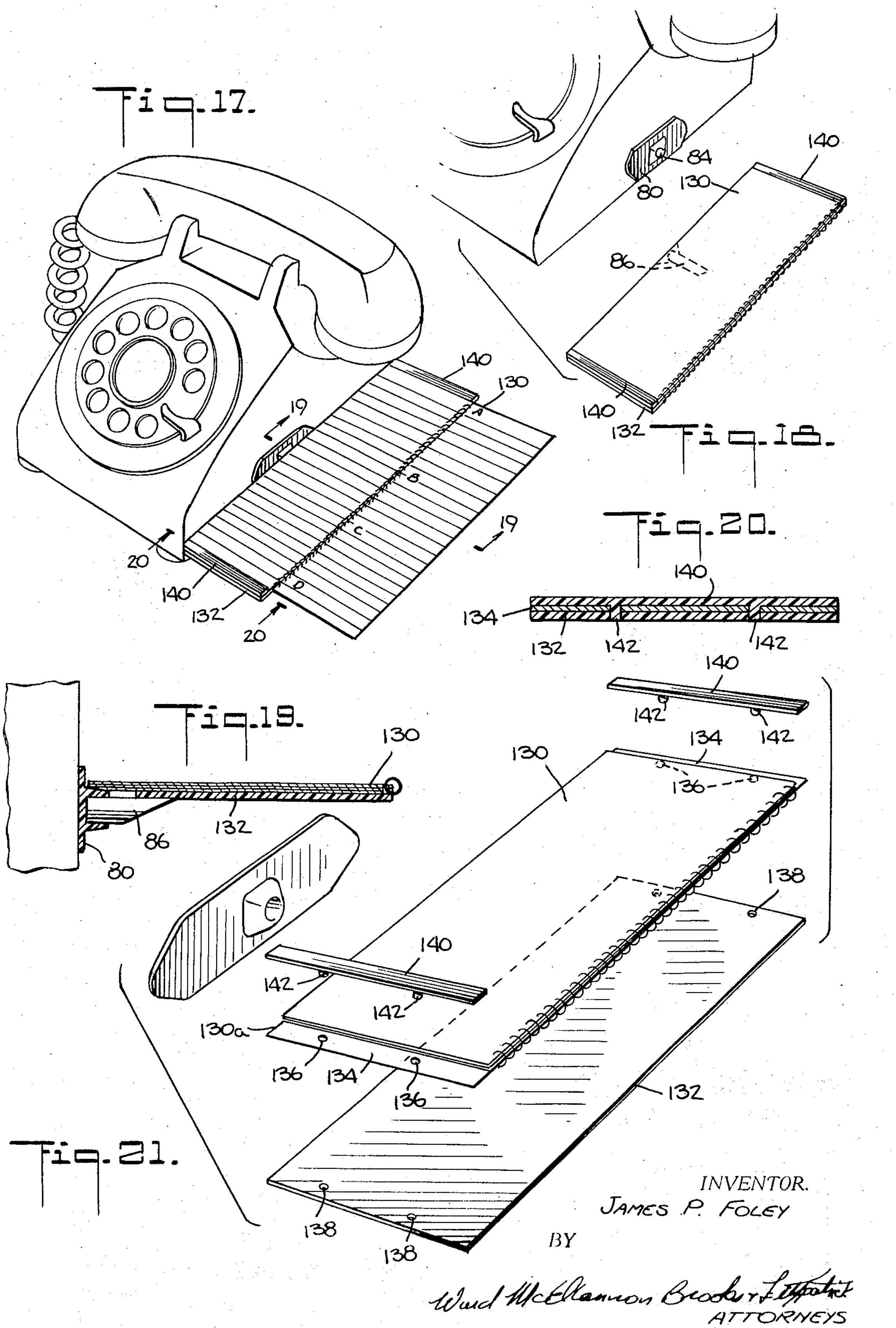
FIG. 17 is a perspective view of a telephone index device, constituting another embodiment of the invention, attached to the side of a telephone.
FIG. 18 is a view similar to FIG. 17 but illustrating the telephone index device as removed from the telephone.
FIG. 19 is an enlarged section view taken along line 19—19 of FIG. 17.
FIG. 20 is an enlarged section view taken along line 20—20 of FIG. 17.
FIG. 21 is an enlarged exploded perspective view of the telephone index device of FIG. 17.

The embodiment of FIGS. 17–21 utilizes a spirally bound book-like telephone index sheet assembly 130. This index sheet assembly is mounted in a manner to be described on a base member 132 which is of generally similar construction to the base member 74 of the preceding embodiments. Thus, as shown in FIGS. 18 and 19 the base member 132 is provided with a mounting plug 86 on its under surface and this mounting plug is accommodated in an opening 84 in a mounting plate 80.

As can be seen in FIG. 21, the book-like telephone index sheet assembly 130 is provided with a lower sheet 130*a* which extends longitudinally a short distance out from each end of the other sheets to provide tabs 134. These tabs have openings 136 which in assembly are aligned with corresponding openings 138 near the ends of the base member. A pair of holding strips 140 extend across each end of the base member. These holding strips have downwardly extending lugs 142 which pass through the openings in the tab of the book-like index assembly and fit tightly into the openings in the base member. These attachment strips thereby serve to hold the book-like assembly tightly onto the base member. When it is desired to remove the book-like assembly for other use or for replacement the attachment strips need merely be pulled up and removed from the base member thereby releasing the book-like assembly. The base member and the attachment strips may be formed of rigid plastic material such as polystyrene or polypropylene; or any other suitable, moldable material.

It will be appreciated that there has been described a very compact and easily manufactured telephone index assembly which provides versatility and convenience in use and which lends itself to economical and simple manufacturing techniques.

Having thus described the invention with particular reference to the preferred form thereof, it will be obvious to those skilled in the art to which the invention pertains, after understanding the invention, that various changes and modifications may be made therein without departing from the spirit and scope of the invention, as defined by the claims appended thereto.

What is claimed as new and desired to be secured by Letters Patent is:

1. A telephone index device for use with a telephone instrument, said device comprising a flat base member having a first base member portion and a second base member portion, said first and said second base member portions being separable, said flat base member portions lying in longitudinal peripheral edge-to-edge coplanar relationship, means for holding said base member on said telephone instrument in a manner such that said longitudinal peripheral edges of said base member portions are parallel to the longitudinal axis of the telephone instrument, a plurality of leaf binding loops of inverted U-shaped configuration for securing a plurality of sheets to said base member, each of said loops being permanently secured to one of said base member portions and extending up from said one of said base member portions and looping over and extending down to the other of said base member portions, each of said loops having a free end for engaging the other of said base member portions, one of said flat base member portions having a plurality of projections extending in the plane thereof away from the longitudinal peripheral edge thereof, each of said projections having lateral extensions at a portion thereof spaced from the base member portion, a plurality of recesses formed along said longitudinal peripheral edge of the other of said base member portions, said recesses having corresponding formations for receiving said projections and the shapes of said projections and recesses being such as to interlock the projections and said recesses and prevent movement of said portions in their plane, and means for preventing relative movement out of their plane.

2. A telephone index device as set forth in claim 1, wherein said means preventing relative movement of said portions out of their plane comprises a strip of tape adhesively secured to and extending along at least one surface of each of said portions.

3. A telephone index device as set forth in claim 2, where in said tape passes over several of said projections and recesses.

4. A telephone index device as set forth in claim 1, wherein said means preventing relative movement of said portions out of their plane comprises adhesively coupling said portions along their line of contact.

5. A telephone index device as set forth in claim 1, wherein said means preventing relative movement of said portions out of their plane is a weld.

6. A telephone index device as set forth in claim 1, wherein said means for holding said base member on said telephone instrument comprises a generally flat frame member configured to fit under said telephone instrument and between the legs thereof, said frame member having a pair of apertures therein for receiving a pair of said legs and having means for slidably receiving said base member, and means for securing said frame member to said telephone instrument.

7. A telephone index device as set forth in claim 6, wherein said frame member has score lines around said apertures to define snap out elements which are severable from said frame member upon application of bending forces thereto thereby to permit enlargement of said apertures for accomodating larger telephone legs.

8. A telephone index device as set forth in claim 7, wherein said frame member has thickened portions along said score lines to maintain structural strength prior to removal of said element.

* * * * *